US012597552B2

(12) United States Patent
Chang et al.

(10) Patent No.: US 12,597,552 B2
(45) Date of Patent: Apr. 7, 2026

(54) MAGNETIC DEVICE AND THE METHOD TO MAKE THE SAME

(71) Applicant: CYNTEC CO., LTD., Hsinchu (TW)

(72) Inventors: YuLun Chang, Miaoli County (TW); Sen-Huei Chen, Yunlin County (TW); Wei-Lun Huang, Taipei City (TW)

(73) Assignee: CYNTEC CO., LTD., Hsinchu (TW)

( * ) Notice: Subject to any disclaimer, the term of this patent is extended or adjusted under 35 U.S.C. 154(b) by 854 days.

(21) Appl. No.: 17/541,255

(22) Filed: Dec. 3, 2021

(65) Prior Publication Data

US 2022/0181070 A1 Jun. 9, 2022

Related U.S. Application Data

(60) Provisional application No. 63/121,253, filed on Dec. 4, 2020.

(51) Int. Cl.

| | |
|---|---|
| ***H01F 27/29*** | (2006.01) |
| ***H01F 27/24*** | (2006.01) |
| ***H01F 27/28*** | (2006.01) |
| ***H01F 41/02*** | (2006.01) |
| ***H01F 41/06*** | (2016.01) |

(52) U.S. Cl.

CPC ......... *H01F 27/2823* (2013.01); *H01F 27/24* (2013.01); *H01F 27/29* (2013.01); *H01F 41/0206* (2013.01); *H01F 41/06* (2013.01)

(58) Field of Classification Search

CPC ...... H01F 27/2823; H01F 27/24; H01F 27/29; H01F 41/0206; H01F 41/06; H01F 2017/046; H01F 2017/048; H01F 27/2852; H01F 27/292; H01F 41/0246; H01F 2003/106; H01F 3/10; H01F 27/28; H01F 27/306; H01F 27/32

USPC .................................. 336/83, 192, 200, 232

See application file for complete search history.

(56) References Cited

U.S. PATENT DOCUMENTS

| | | | |
|---|---|---|---|
| 8,723,629 B1 | 5/2014 | Liu et al. | |
| 11,626,240 B2 | 4/2023 | Sato et al. | |
| 2019/0198231 A1* | 6/2019 | Kawamura | H01F 27/327 |
| 2019/0304660 A1 | 10/2019 | Kawarai et al. | |
| 2020/0075226 A1 | 3/2020 | Ogasawara | |

FOREIGN PATENT DOCUMENTS

| | | |
|---|---|---|
| CN | 201207320 | 3/2009 |
| CN | 205159028 U | 4/2016 |
| TW | 109207198 | 9/2020 |
| WO | 2020121421 A1 | 6/2020 |

* cited by examiner

*Primary Examiner* — Tuyen T Nguyen

(74) *Attorney, Agent, or Firm* — Min-Lee Teng

(57) ABSTRACT

A magnetic device, comprising a body and a coil disposed in the body, wherein a terminal part of the conductive wire forming the coil comprises a first portion and a second portion, wherein the first portion is exposed from the body for forming an electrode, wherein the second portion of the terminal part is deformed for increasing the distance between the terminal part of the conductive wire and the coil for preventing a short circuit.

4 Claims, 18 Drawing Sheets

100

MAGNETIC DEVICE AND THE METHOD TO MAKE THE SAME

CROSS-REFERENCES TO RELATED APPLICATIONS

This application claims the benefit of U.S. Provisional Patent Application No. 63/121,253, filed on Dec. 4, 2020, which is hereby incorporated by reference herein and made a part of the specification.

BACKGROUND OF THE INVENTION

I. Field of the Invention

The present invention relates to a magnetic device, and in particular, to an inductor having a coil disposed in a body of the inductor.

II. Description of Related Art

Conventional magnetic devices such as an inductor made by using a T-core comprising a bottom base and a pillar on the bottom base, wherein a coil made of a conductive wire wound around the pillar of the T-core, wherein the T-core is pressed for forming a body of the inductor with the bottom base being located lower than the pillar of the T-core.

However, when the T-core is pressed, it might cause a short circuit between a terminal part of the conductive wire and the winding turns of the coil.

Therefore, a better solution is needed to resolve the above-mentioned issues.

SUMMARY OF THE INVENTION

One objective of the present invention is to increase the distance between a terminal part of a conductive wire that forms a coil inside a body of a magnetic device for preventing a short circuit between the coil and the terminal part.

In one embodiment of the present invention, a magnetic device is disclosed, wherein the magnetic device comprises: a body; and a coil, formed by a conductive wire and disposed in the body, wherein a terminal part of the conductive wire comprises a first portion and a second portion, wherein at least one portion of the first portion is exposed from the body for forming an electrode and the second portion extends from a top portion of the coil to an endpoint of the first portion, wherein the second portion comprises an outer surface that has a convex curve relative to a vertical line passing through the endpoint of the first portion.

In one embodiment, the body comprises a magnetic body, wherein a coil is disposed in the magnetic body.

In one embodiment, the magnetic device is an inductor.

In one embodiment, a maximum distance between said convex curve and the vertical line is greater than one-half of a thickness of the conductive wire.

In one embodiment, the magnetic body comprises a T-core comprising a base and a pillar on the base with a through-opening being formed on a corner of the base, wherein at least one portion of the first terminal part of the conductive wire is disposed inside the through-opening.

In one embodiment, the magnetic body comprises a T-core comprising a base and a pillar on the base with a through-opening being formed on a corner of the base, wherein at least one portion of the first terminal part of the conductive wire is disposed inside the through-opening.

In one embodiment, at least one first metal layer is formed on a bottom surface of the body and extends to a lateral surface of the body, wherein the first metal layer is electrically connected to the first portion of the conductive wire to form an electrode of the magnetic device, wherein a height of the first metal layer disposed on the lateral surface of the body is in a range of 31.3%~35.3% of a total height of the lateral surface of the body.

In one embodiment, at least one first metal layer is formed on a bottom surface of the body and electrically connected to the first portion of the conductive wire to form an electrode of the magnetic device, wherein a length of the first portion exposed from the body is in a range of 47.5~52.5% of a total length of the bottom surface of the body.

In one embodiment, at least one first metal layer is formed on a bottom surface of the body and electrically connected to the first portion of the conductive wire to form an electrode of the magnetic device, wherein a length of the first portion exposed from the body is in a range of ⅙~½ of a total length of the bottom surface of the body.

In one embodiment, the conductive wire is a flat wire.

In one embodiment, the magnetic body comprises a T-core comprising a base and a pillar, wherein the base and the pillar are made of different magnetic materials.

In one embodiment, a method to form a magnetic device is disclosed, said method comprising: forming a U-core; disposing a coil in the U-core, wherein the coil is formed by a conductive wire, wherein a terminal part of the conductive wire comprises a first portion and a second portion, wherein the first portion and the second portion of the terminal part of the conductive wire forms an angle between 110 degree and 150 degree; and disposing a T-core on the coil, wherein the T-core comprises a base and a pillar on the base with a through-opening formed on a corner of the base, wherein at least one portion of the terminal part of the conductive wire is disposed in the through-opening; and pressing the T-core and the first portion of the terminal part of the conductive wire for forming the magnetic device.

In one embodiment, the body comprises a magnetic body, wherein a coil is disposed in the magnetic body.

In one embodiment, the magnetic body comprises a T-core comprising a base and a pillar on the base with a through-opening being formed on a corner of the base, wherein at least one portion of the terminal part of the conductive wire is disposed inside the through-opening.

In one embodiment, the base comprises a surface, wherein the surface and a horizontal plan forms an angle between 20 degree and 60 degree, wherein the first portion of the terminal part of the conductive wire is placed on the surface.

In one embodiment, the method further comprising forming at least one first metal layer on a bottom surface of the body, wherein said first metal layer extends to a lateral surface of the body and is electrically connected to the first portion of the conductive wire to form an electrode of the magnetic device, wherein a height of the first metal layer disposed on the lateral surface of the body is in a range of 31.3%-35.3% of a total height of the lateral surface of the body.

In one embodiment, the conductive wire is an insulated conductive wire.

In one embodiment, the conductive wire is a flat wire.

In one embodiment, the conductive wire is an insulated and flat conductive wire.

In one embodiment, the magnetic body comprises a T-core comprising a base and a pillar, wherein the base and the pillar are made of different magnetic materials.

In one embodiment, the T-core is not cured when the T-core and the first portion of the terminal part of the conductive wire are hot-pressed for forming the magnetic device.

In one embodiment of the present invention, a magnetic device is disclosed, wherein the magnetic device comprises: a body; and a coil, disposed in the body, wherein the coil is formed by a conductive wire and has a plurality of winding turns with at least one portion of a first terminal part of the conductive wire exposed from the body, wherein a first electrode of the magnetic device comprises at least one first metal layer that is disposed on the bottom surface of the body and electrically connected to the first terminal part of the conductive wire and at least one second metal layer that is disposed on a lateral surface of the body and electrically connected to the at least one first metal layer, wherein a first height of the first electrode disposed on the lateral surface of the body is greater than zero and not greater than a second height from a top surface of the plurality of winding turns to a bottom surface of the plurality of winding turns.

In one embodiment, wherein the at least one first metal layer and the at least one second metal layer are electroplated on the body.

In one embodiment, the magnetic device is an inductor, wherein the body comprises a magnetic body.

In one embodiment, the first electrode disposed on the lateral surface of the body does not extend across the bottom surface of the plurality of winding turns.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
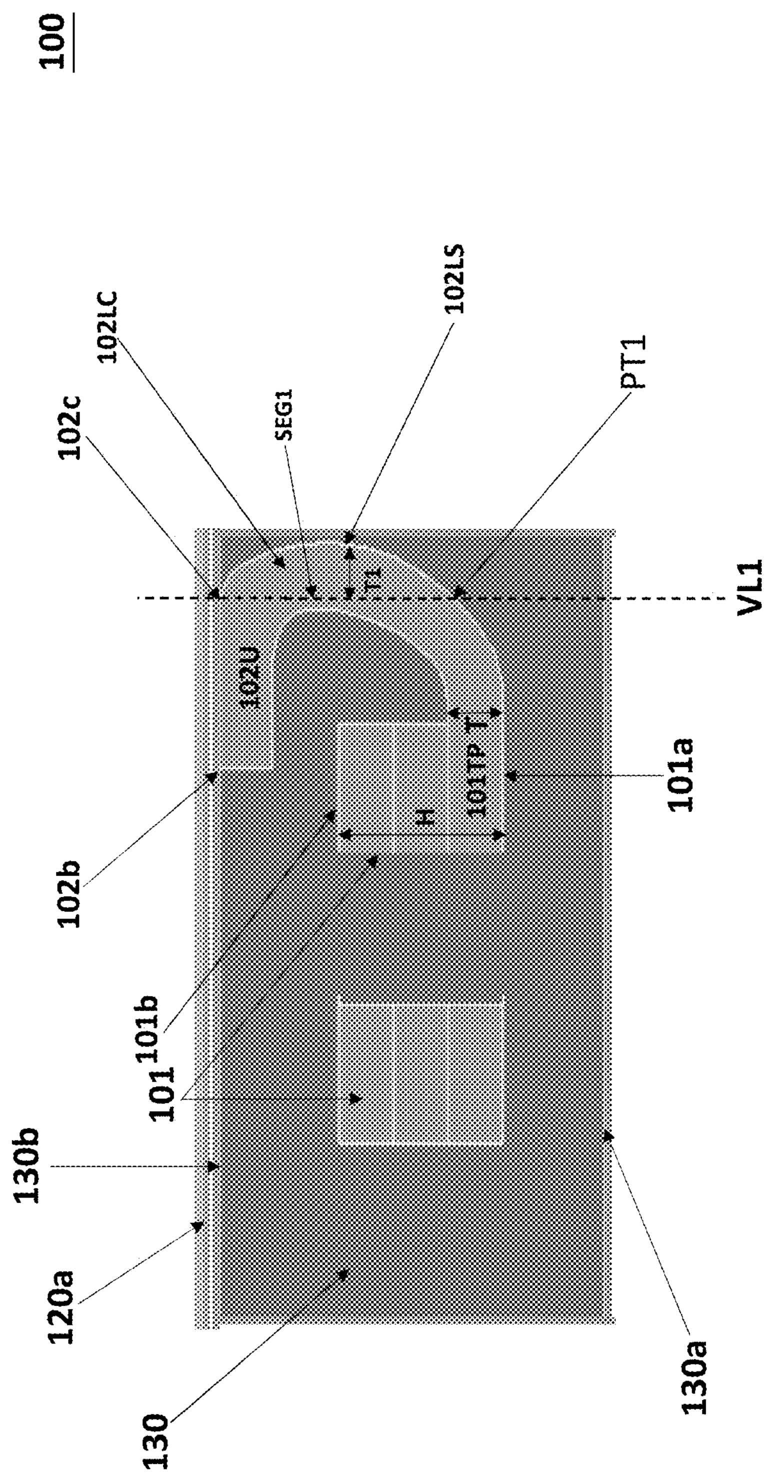
FIG. 1A is a side view illustrating a magnetic device showing a first terminal part according to one embodiment of the present invention.

FIG. 1A depicts an enlarged cross-sectional view of a magnetic device 100 showing a first terminal part according to one embodiment of the present invention, wherein the magnetic device 100 comprises a body 130 having a top surface 130*a* and a bottom surface 130*b*; and a coil 101 that is formed by a conductive wire and disposed in the body 130, wherein the coil 101 comprises a plurality of winding turns having a top surface 101*a* and a bottom surface 101*b*, wherein a first terminal part of the conductive wire comprises a first portion 102U having a beginning point 102*b* and an endpoint 102*c* and a second portion 102LC, wherein at least one portion of the first portion 102U is exposed from the body 130 for forming an electrode of the magnetic device 100, and the second portion 102LC extends from a top portion 101TP of the coil 101 to the endpoint 102*c* of the first portion 102U of the first terminal part of the conductive wire, wherein the second portion 102LC comprises an outer surface that has a convex curve 102LS relative to a vertical line VL1 passing through the endpoint 102*c* of the first portion 102U of the first terminal part of the conductive wire, wherein a second height H is measured from the top surface 101*a* to the bottom surface 101*b* of the plurality of winding turns of the coil, wherein the plurality of winding turns are stacked along a vertical direction, wherein the vertical line VL1 passing through the endpoint 102*c* passes through the second portion 102LC of the first terminal part and intersects the outer surface at a first intersection point PT1, and the convex curve 102LS is a smooth curve extending from the endpoint 102*c* to the first intersection point PT1, wherein a line segment SEG1 of the vertical line VL1 extending from the endpoint 102*c* to the first intersection point PT1 does not have any part that is located outside the boundary of the first terminal part of the flat wire.

Figure 1B:
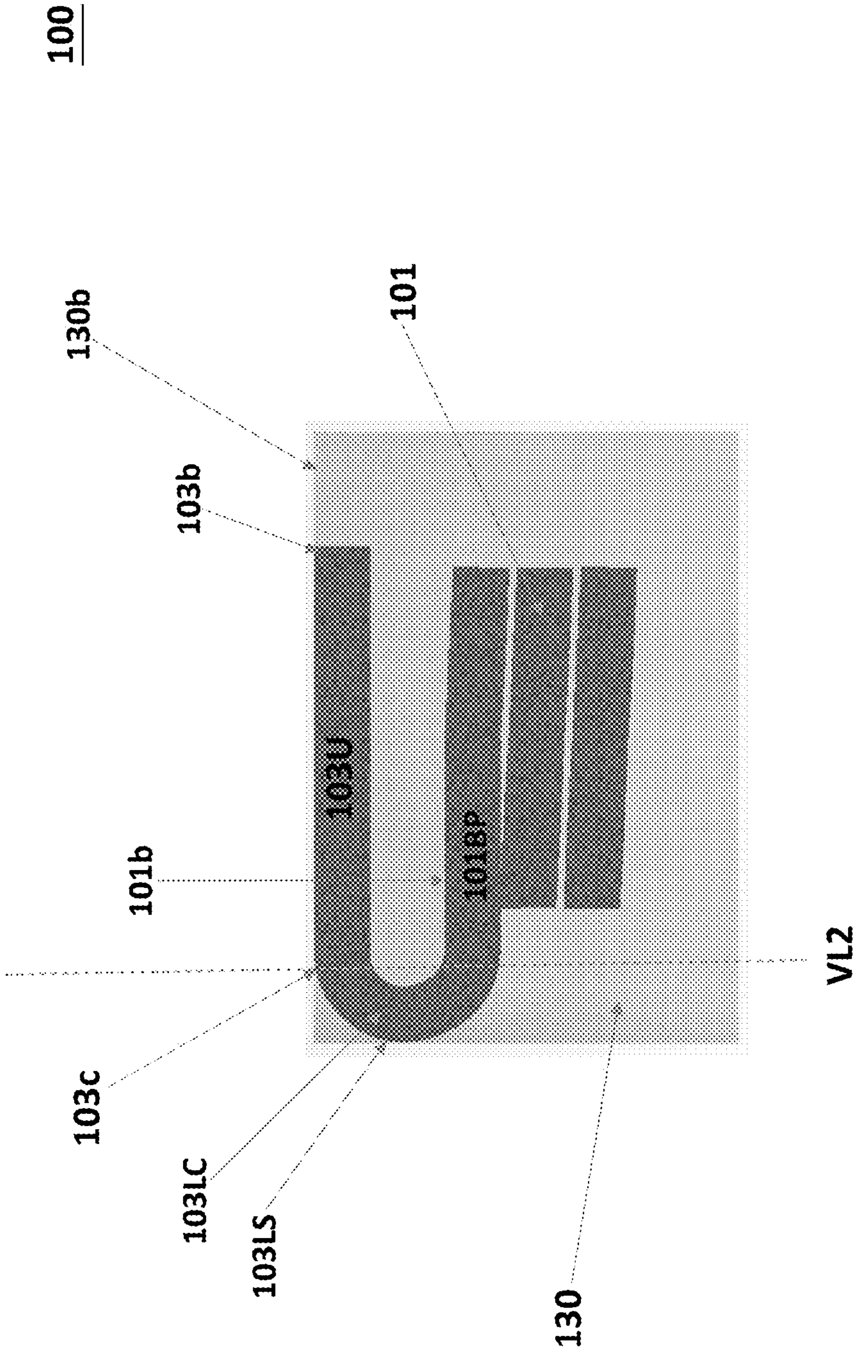
FIG. 1B is a side view illustrating a magnetic device showing a second terminal part according to one embodiment of the present invention.

In one embodiment, as shown in FIG. 1B, wherein a second terminal part of the conductive wire comprises a first portion 103U having a beginning point 103*b* and an endpoint 103*c* and a second portion 103LC, wherein at least one portion of the first portion 103U is exposed from the bottom surface 130*b* of the body 130 for forming a second electrode of the magnetic device 100, and the second portion 103LC extends from a bottom portion 101BP of the coil 101 to the endpoint 103*c* of the first portion 103U of the second terminal part of the conductive wire, wherein the second portion 103LC comprises an outer surface that has a convex curve 103LS relative to a vertical line VL2 passing through the endpoint 103*c* of the first portion 103U of the second terminal part of the conductive wire.

In one embodiment, the body 130 comprises a magnetic body, wherein the coil 101 is disposed in the magnetic body.

In one embodiment, the magnetic device 100 is an inductor.

In one embodiment, at least one metal first layer 120 is disposed on the top surface of the body 130 and electrically connected to the first portion 102U of the first terminal part of the conductive wire.

In one embodiment, as shown in FIG. 1A, a maximum distance T1 between said convex curve 102LS and the vertical line VL1 is greater than one-half of a thickness T of the conductive wire.

Figure 1C:
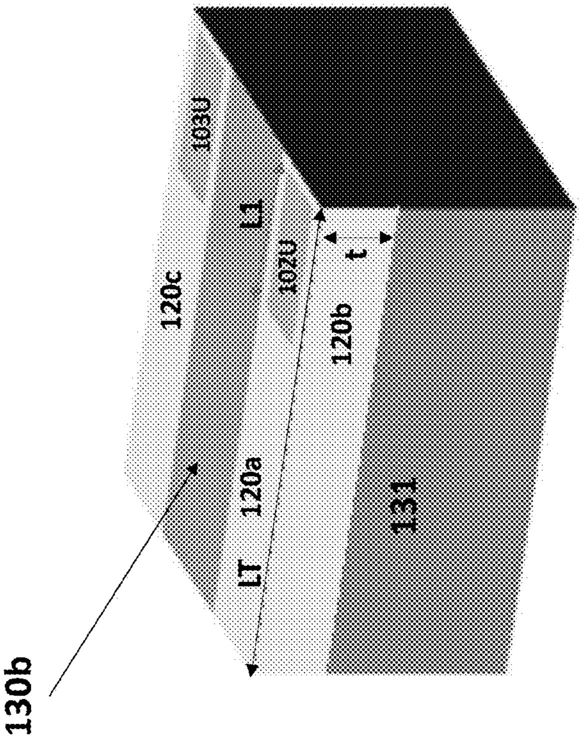
FIG. 1C is a bottom view illustrating a magnetic device according to one embodiment of the present invention.

In one embodiment, as shown in FIG. 1C, wherein a first portion 102U of the first terminal part of the conductive wire, such as an enameled copper wire, is stripped by using laser, wherein at least one first metal layer 120*a* can be disposed on the bottom surface 130*b* of the body 130 and electrically connected to the first portion 102U of the first terminal part of the conductive wire for forming a first electrode on the body 130. Likewise, a first portion 103U of the second terminal part of the conductive wire, such as an enameled copper wire, is stripped by using laser, wherein at least one first metal layer 120*c* can be disposed on the bottom surface 130*b* of the body 130 and electrically connected to the first portion 103U of the second terminal part of the conductive wire for forming a second electrode on the body 130, wherein at least one second metal layer 120*b* is disposed on a lateral surface 131 of the body 130 and electrically connected to the at least one first metal layer 120*a*.

In one embodiment, as shown in FIG. 1A, the coil 101 has a plurality of winding turns having top surface 101*a* to a bottom surface 101*b*, wherein an electrode of the magnetic device 100 comprises at least one first metal layer 120*a* that is disposed on a bottom surface 130*b* of the body 130 and electrically connected to the first terminal part 112U of the conductive wire and at least one second metal layer 120*b* that is disposed on a lateral surface 131 of the body 130 and electrically connected to the at least one first metal layer 120*a*, wherein a first height t of the electrode disposed on the lateral surface 131 of the body 130, as shown in FIG. 1C, is greater than zero and not greater than a second height H from the top surface 101*a* to the bottom surface 101*b* of the plurality of winding turns of the coil, as shown in FIG. 1A.

In one embodiment, as shown in FIG. 1C, at least one first metal layer 102*a* is formed on the bottom surface 130*b* of the body 130 and electrically connected to the first portion 102U of the conductive wire to form a first electrode of the magnetic device 100, wherein a length L1 of the first portion 102U of the first terminal part exposed from the body 130 is in a range of 47.5~52.5% of a total length LT of the bottom surface 130*b* of the body 130, wherein the length L1 is measured from the beginning point 102*b* to the endpoint 102*c* of the first portion 102U of the first terminal part of the conductive wire.

In one embodiment, the at least one first metal layer 120*a* and the at least one second metal layer 120*b* are made of same material. In one embodiment, the at least one first metal layer 120*a* and the at least one second metal layer 120*b* can be made of different materials.

In one embodiment, the conductive wire forming the plurality of winding turns is an insulated conductive wire.

In one embodiment, the conductive wire forming the plurality of winding turns is an enameled conductive wire.

In one embodiment, the conductive wire forming the plurality of winding turns is an enameled copper wire.

In one embodiment, the conductive wire is a flat wire.

In one embodiment, the conductive wire is a round wire.

In one embodiment, the magnetic body comprises a T-core comprising a base and a pillar, wherein the base and the pillar are made of different magnetic materials.

Figure 1D:
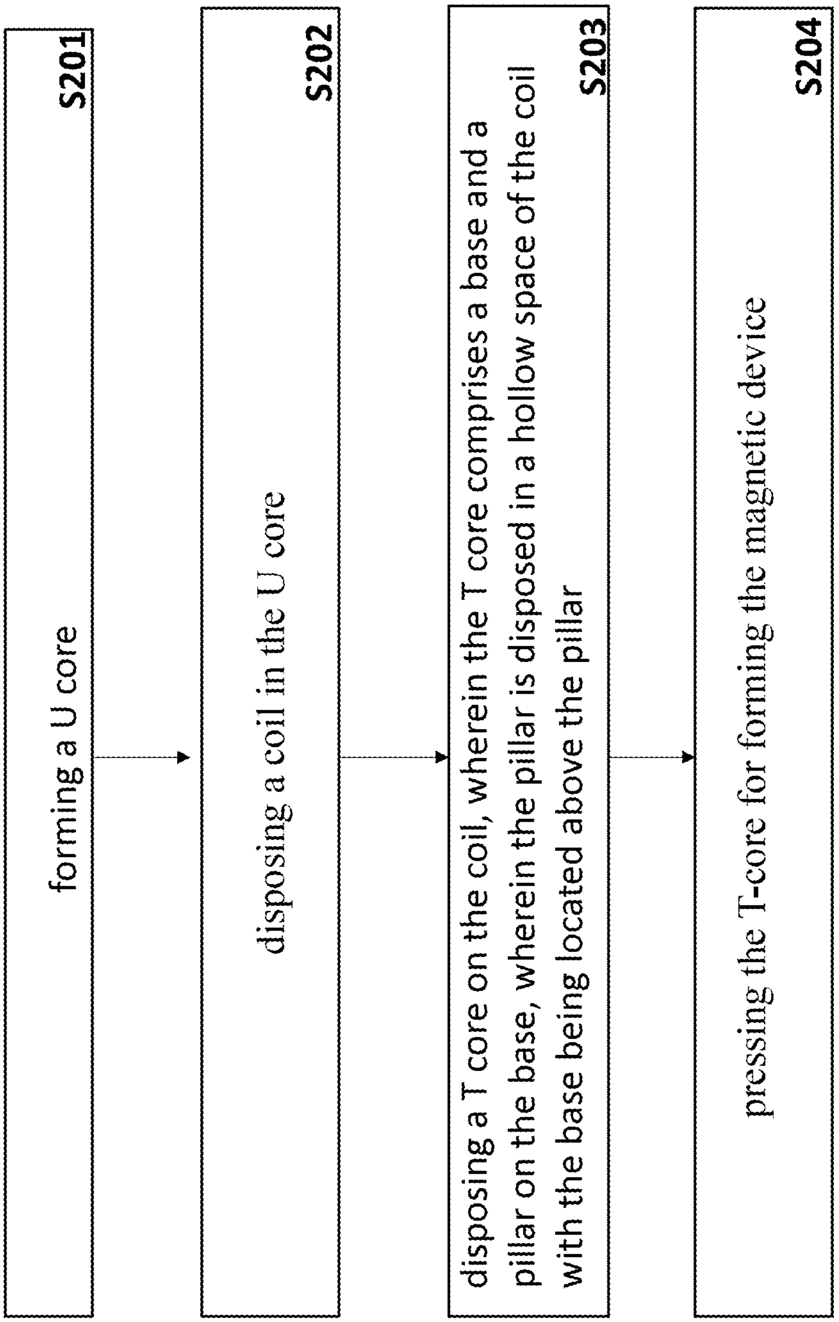
FIG. 1D illustrates a method for forming the magnetic device according to one embodiment of the present invention.

In one embodiment, as shown in FIG. 1D, a method to form a magnetic device is disclosed, said method comprising: step S201: forming a U-core; step S202: disposing a coil in the U-core; and step S203: disposing a T-core on the coil, wherein the T-core comprises a base and a pillar on the base, wherein the pillar is disposed in a hollow space of the coil, and the base is located above the pillar; and step S204: pressing the T-core and the first portion of the terminal part of the conductive wire for forming the magnetic device.

Figure 2A:
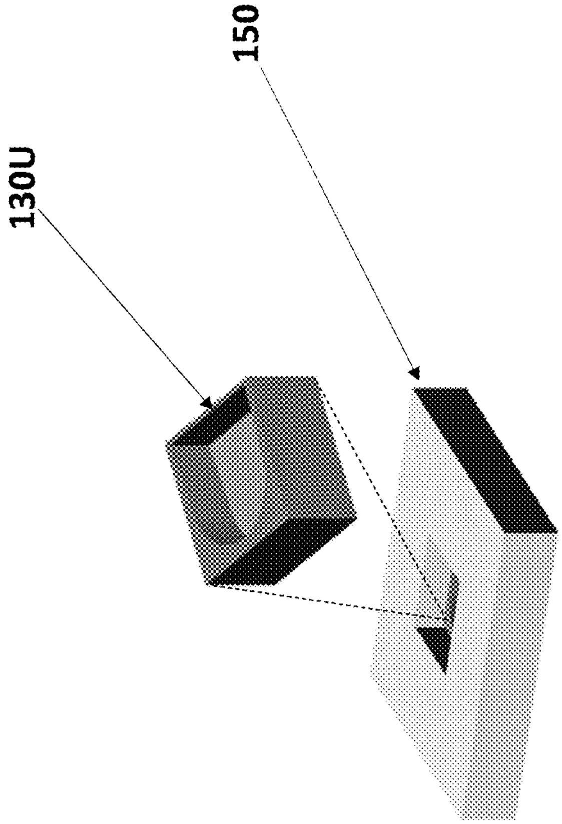
FIG. 2A illustrates a U-core for forming the magnetic device according to one embodiment of the present invention.

In one embodiment, as shown in FIG. 2A, a U-core 130U is formed by filling mixed magnetic powders in a mold 150, and the mixed magnetic powders can be pressed to form a U-core 130U.

Figure 2B:
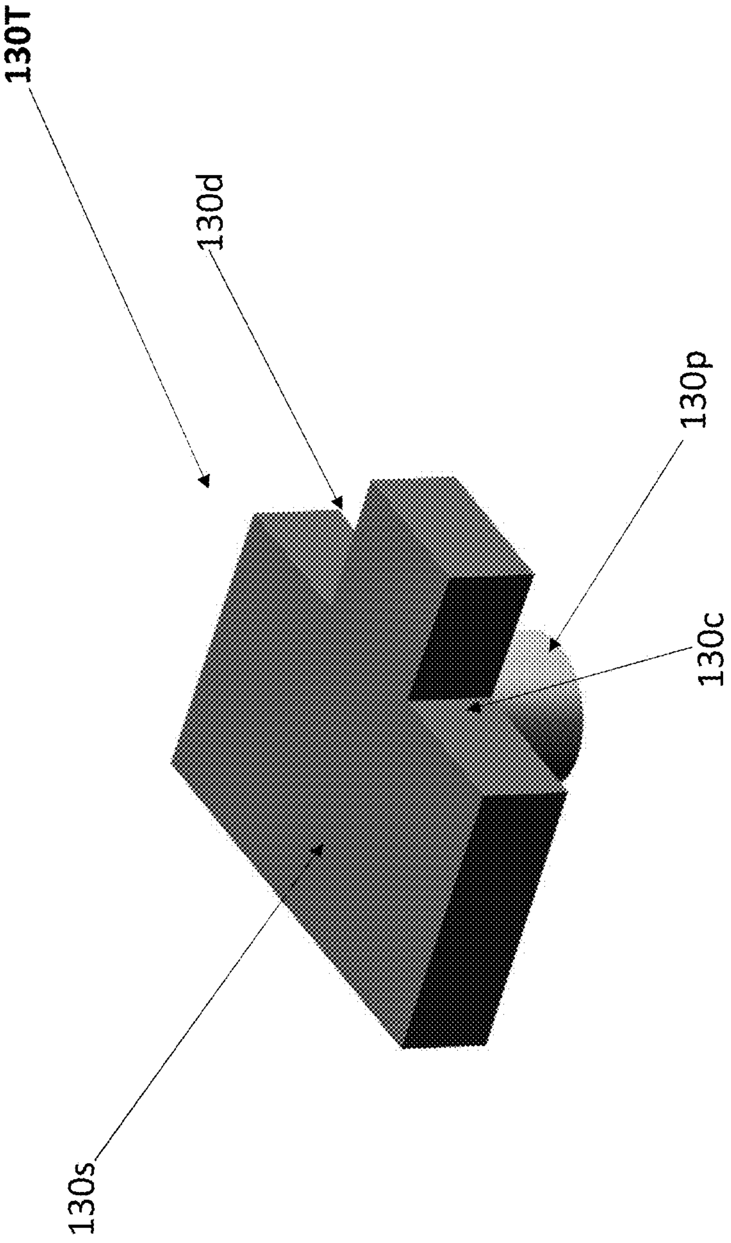
FIG. 2B illustrates a T-core for forming the magnetic device according to one embodiment of the present invention.

In one embodiment, as shown in FIG. 2B, a T-core 130T comprising a base 130*s* and a pillar 130*p* on the base, wherein a first through-opening 130*c* is formed on a corner of the base, wherein a first portion 102U of a first terminal part of the conductive wire can be disposed in the through-opening 130*c*. Likewise, a through-opening 130*d* is formed on a corner of the base, wherein a first portion 103U of a second terminal part of the conductive wire can be disposed in the through-opening 130*d*.

Figure 2C:
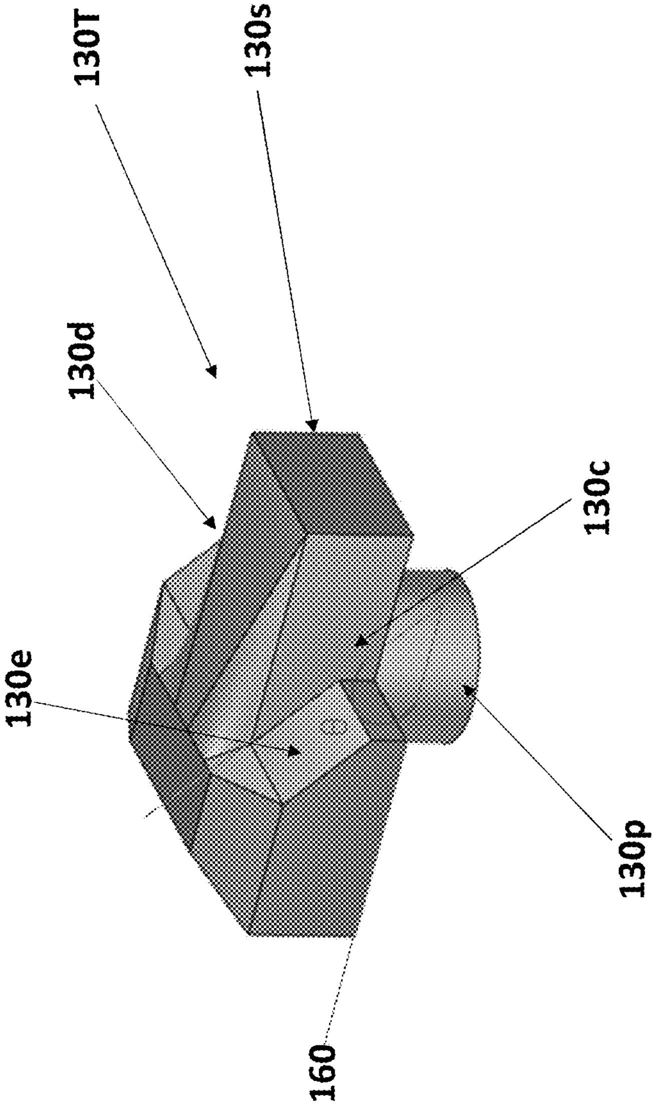
FIG. 2C illustrates another T-core for forming the magnetic device according to one embodiment of the present invention.

In one embodiment, as shown in FIG. 2C, the base 130*s* of a T-core 130T comprises a top surface 130*e*, wherein the top surface 130*e* and a horizontal plan 160 form an angle θ between 20 degree and 60 degree, wherein the first portion 102U of the terminal part of the conductive wire is placed on the top surface 130*e*.

In one embodiment, the T-core 130T is not cured when the T-core 130T and the first portion 102U of the first terminal part of the conductive wire are hot-pressed for forming the body 130 of the magnetic device 100.

Figure 2D:
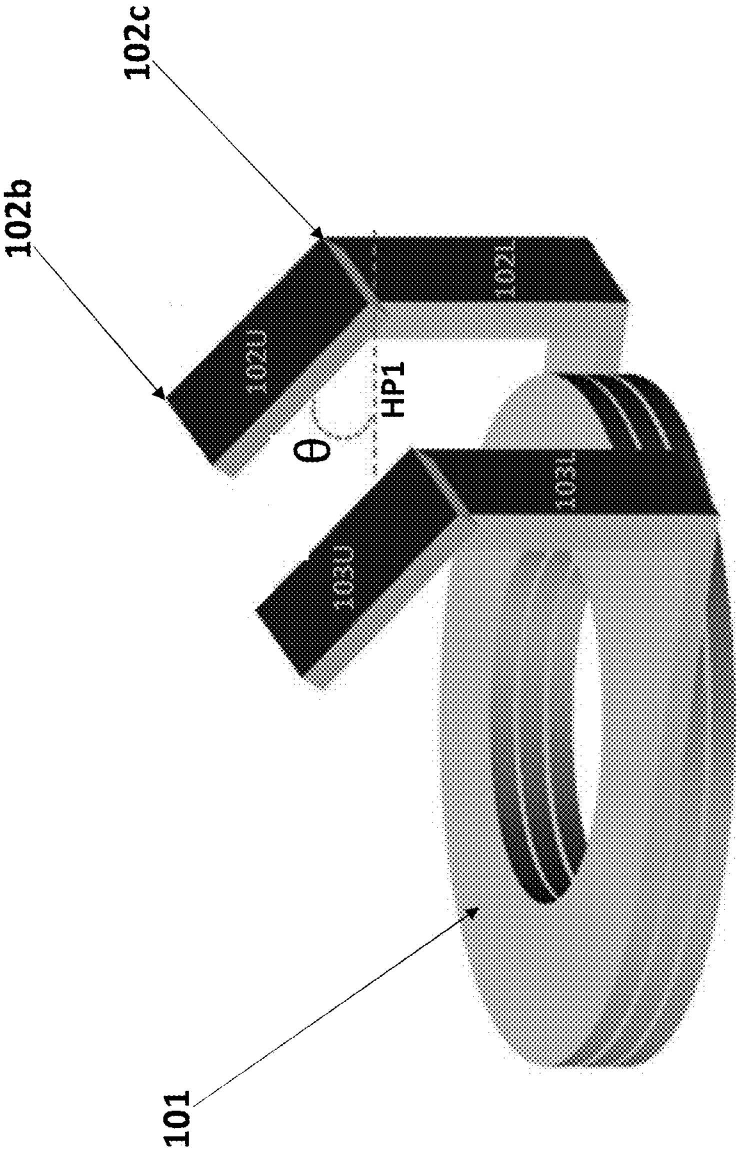
FIG. 2D illustrates a coil for forming the magnetic device according to one embodiment of the present invention.

In one embodiment, as shown in FIG. 2D, a coil 101 is formed by a conductive wire, wherein a first terminal part of the conductive wire comprises a first portion 102U and a second portion 102L, wherein the first portion 102U and a horizontal plan HP1 forms an angle θ between 20 degree and 60 degree, or the first portion 102U and the second portion 102L of the first terminal part of the conductive wire forms an angle between 110 degree and 150 degree. Likewise, a second terminal part of the conductive wire comprises a first portion 103U and a second portion 103L, wherein the first portion 103U and the second portion 103L of the second terminal part of the conductive wire forms an angle between 110 degree and 150 degree.

Figure 2E:
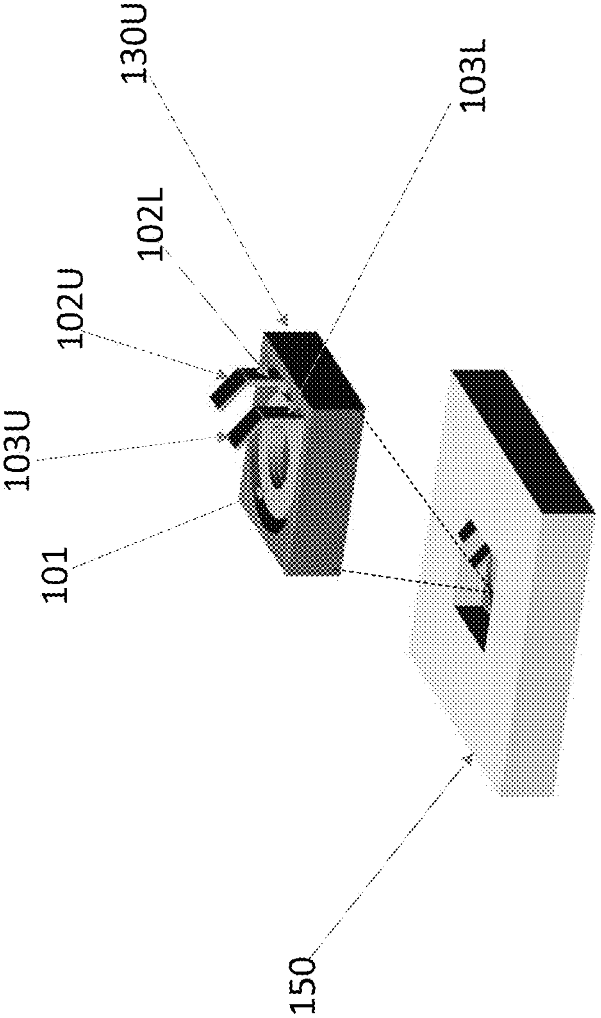
FIG. 2E illustrates a coil being placed in the U-core for forming the magnetic device according to one embodiment of the present invention.

In one embodiment, as shown in FIG. 2E, the coil 101 is placed in the U-core 130Un.

Figure 2F:
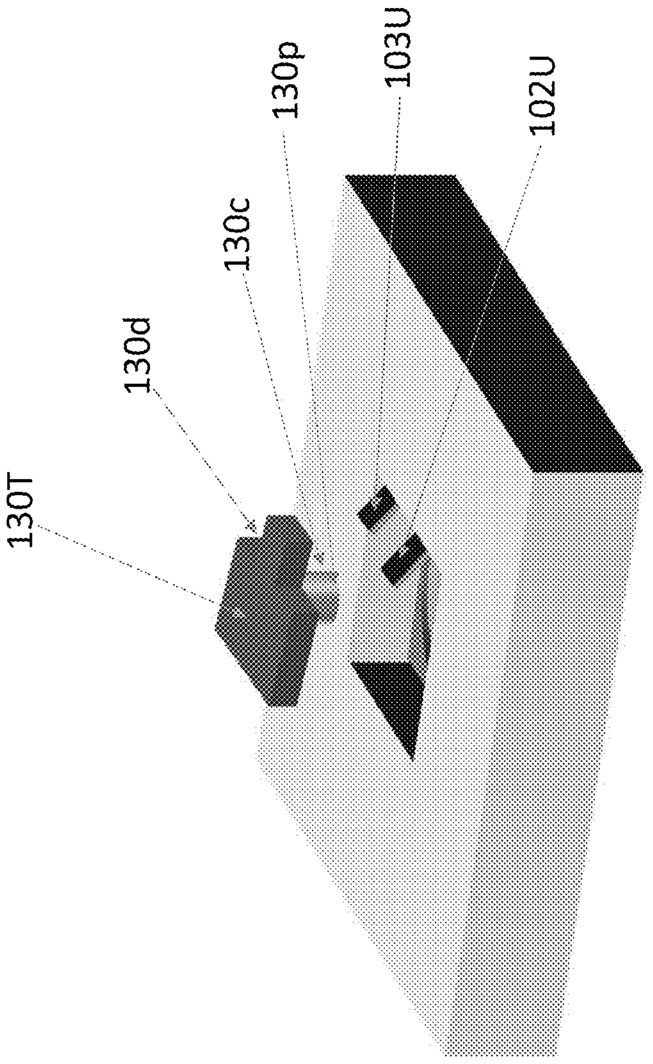
FIG. 2F illustrates disposing a T-core on the coil with a pillar of the T-core placed in a hollow space of the coil for forming the magnetic device according to one embodiment of the present invention.

In one embodiment, as shown in FIG. 2F, a T-core 130T is disposed on the coil 101 with a pillar of the T-core 130T placed in a hollow space of the coil for forming the magnetic device according to one embodiment of the present invention, wherein a first portion 102U of the first terminal part of the conductive wire is disposed in a through-opening 130*c* in the T-core 130T. Likewise, a first portion 103U of the first second terminal part of the conductive wire is disposed in a through-opening 130*d* in the T-core 130T.

Figure 2G:
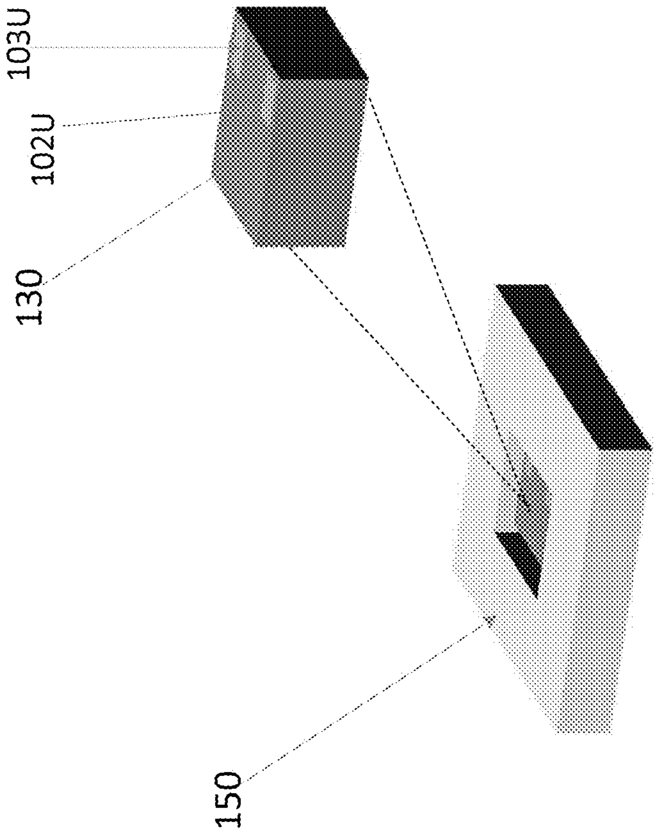
FIG. 2G illustrates a body of the magnetic device is formed by pressing the T-core according to one embodiment of the present invention.

In one embodiment, as shown in FIG. 2G, the T-core 130T and the first portion 102U of the first terminal part of the conductive wire are hot-pressed for forming a body 130 of the magnetic device.

Different from the conventional ways to make a magnetic device such as an inductor, in the present invention, the coil and the uncured T-core are placed upside-down, that is, the base is located above the pillar, when the first portion of the terminal part of the conductive wire and the T-core are hot-pressed for forming the body of the magnetic device, wherein the second portion of the terminal part of the conductive wire can be pushed away from the coil, thereby increasing the distance between a terminal part of a conductive wire and the winding turns of the coil inside the body for preventing a short circuit between the winding turns of the coil and the terminal part.

Figure 2H:
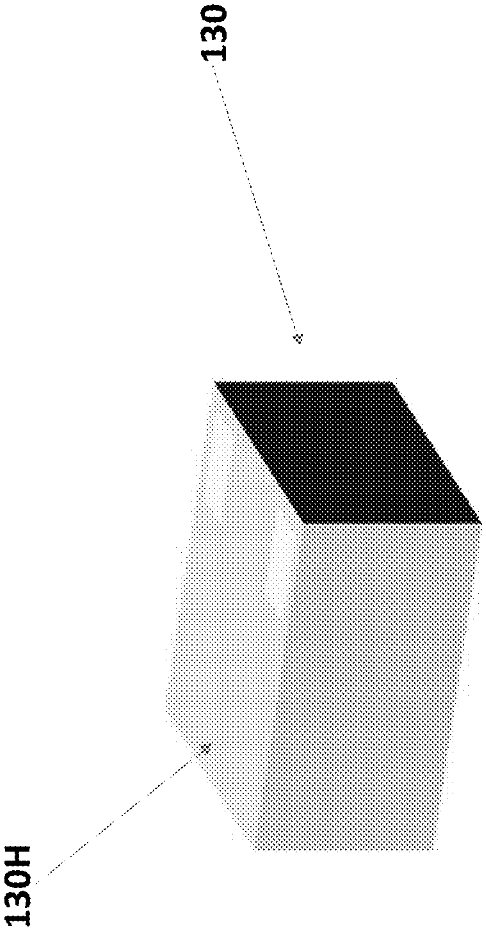
FIG. 2H illustrates a body of the magnetic device is coated with an insulating layer according to one embodiment of the present invention.

In one embodiment, as shown in FIG. 2H, the body 130 of the magnetic device is coated with an insulating layer 130H. In one embodiment, the insulating layer 130H can be an insulating glue layer.

Figure 2I:
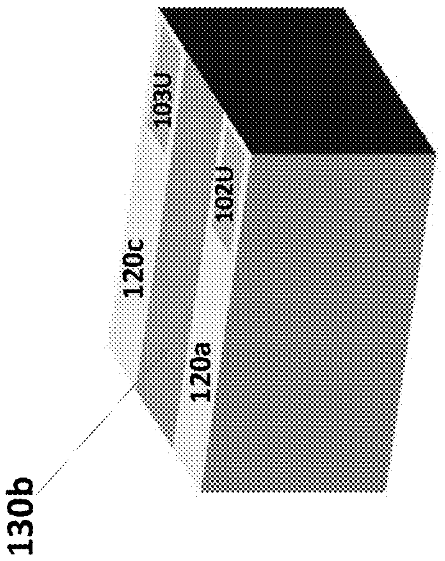
FIG. 2I illustrates striping an enameled copper wire by using laser for forming the coil to form an electrode area on a bottom surface of the body according to one embodiment of the present invention.

In one embodiment, as shown in FIG. 2I, wherein a first portion 102U of the first terminal part of the conductive wire, such as an enameled copper wire, is stripped by using laser, wherein at least one first metal layer 120*a* can be disposed on the bottom surface 130*b* of the body 130 and electrically connected to the first portion 102U of the first terminal part of the conductive wire for forming a first electrode on the body 130. Likewise, a first portion 103U of the second terminal part of the conductive wire, such as an enameled copper wire, is stripped by using laser, wherein at least one metal layer 120*c* can be disposed on the bottom surface 130*b* of the body 130 and electrically connected to the first portion 103U of the second terminal part of the conductive wire for forming a second electrode on the body 130.

Figure 2J:
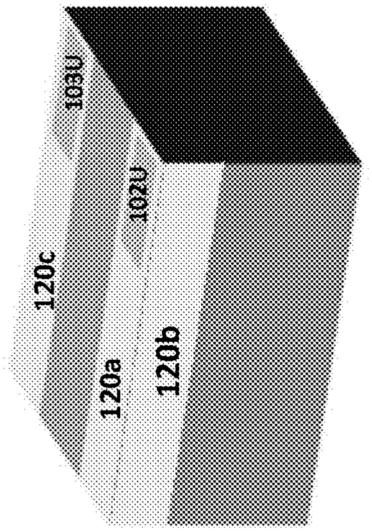
FIG. 2J illustrates forming an electrode area on a lateral surface of the body according to one embodiment of the present invention.

In one embodiment, as shown in FIG. 2J, wherein an electrode area comprising at least one second metal layer 120*b* is formed on a lateral surface 131 of body 130, wherein the electrode area comprising at least one second metal layer 120*b* is electrically connected to the first portion 102U of the first terminal part of the conductive wire.

Figure 2K:
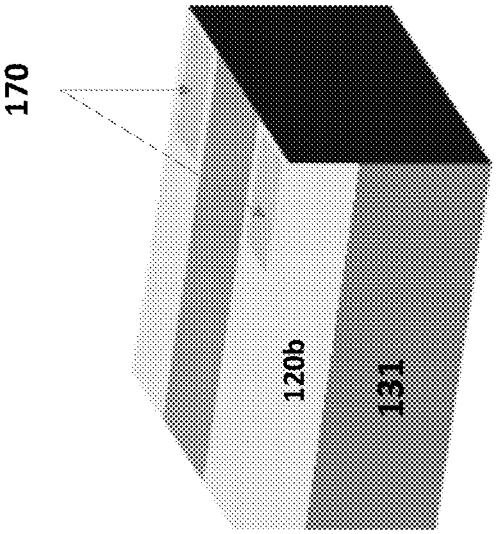
FIG. 2K illustrates electroplating copper/Ni/Sn on the electrodes according to one embodiment of the present invention.

In one embodiment, as shown in FIG. 2K, wherein copper/Ni/Sn 170 can be electroplated on the electrodes.

In one embodiment, the method further comprising forming at least one first metal layer on a bottom surface and a lateral surface of the body, wherein the at least one first metal layer is electrically connected to the first portion of the conductive wire to form an electrode of the magnetic device, wherein a height of the first metal layer disposed on the lateral surface of the body is in a range of 31.3%~35.3% of a total height of the lateral surface of the body, as shown in FIG. 1B.

In one embodiment, the method further comprising forming at least one first metal layer on a bottom surface of the body, wherein at least one first metal layer is electrically connected to the first portion of the conductive wire to form an electrode of the magnetic device, wherein a length of the first portion exposed from the body is in a range of ⅙~½ of a total length of the bottom surface of the body, as shown in FIG. 1B.

In one embodiment, the method further comprising forming at least one first metal layer on a bottom surface of the body, wherein at least one first metal layer is electrically connected to the first portion of the conductive wire to form an electrode of the magnetic device, wherein a length of the first portion exposed from the body is in a range of 47.5~52.5% of a total length of the bottom surface of the body, as shown in FIG. 1B.

In one embodiment, the conductive wire is a flat wire.

In one embodiment, the magnetic body comprises a T-core comprising a base and a pillar, wherein the base and the pillar are made of different magnetic materials.

In one embodiment, the mixed magnetic powders comprises at least one of the following materials: amorphous powder, nanocrystalline powder, carbonyl iron powder, alloy powder, Hi-Flux, sendust, MPP, and Ferrite.

In one embodiment, a method to form a magnetic device is disclosed, said method comprising: forming a U-core; disposing a coil in the U-core, wherein the coil is formed by a conductive wire, wherein a terminal part of the conductive wire comprises a first portion and a second portion, wherein the first portion and the second portion of the terminal part of the conductive wire forms an angle between 110 degree and 150 degree; and disposing a T-core on the coil, wherein the T-core comprises a base and a pillar on the base with a through-opening formed on a corner of the base, wherein a first portion of the terminal part of the conductive wire is disposed in the through-opening; and pressing the T-core and the first portion of the terminal part of the conductive wire for forming the magnetic device.

Figure 3C:
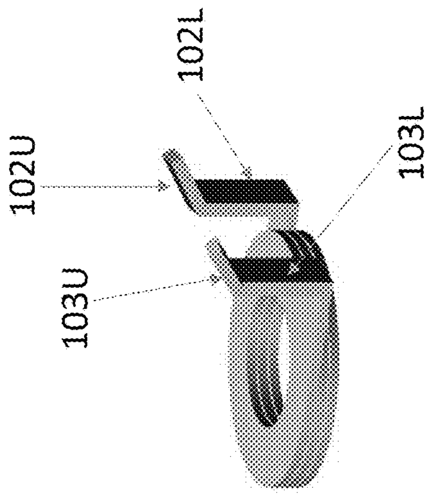
FIG. 3A-3C each illustrates a type of a coil for forming the magnetic device according to one embodiment of the present invention.
Figure 3B:
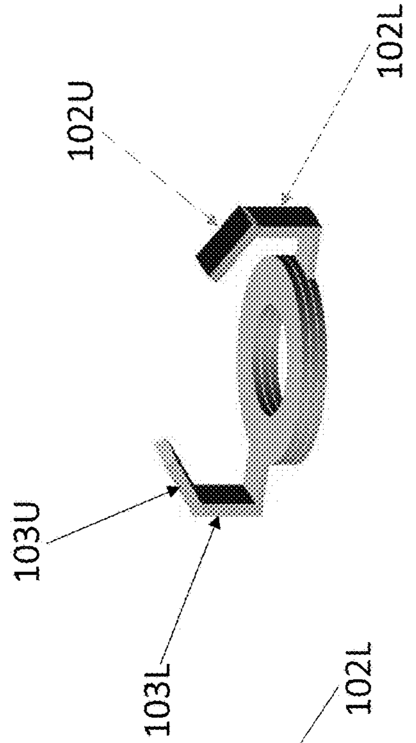
Figure 3A:
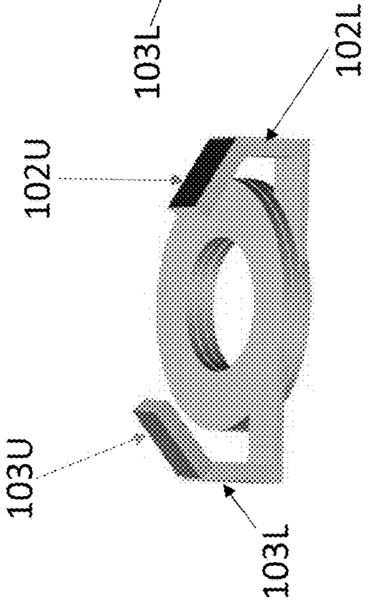

In one embodiment, as shown in FIG. 3A-3C, wherein each illustrates a type of coil that can be used for forming the magnetic device, wherein a first terminal part of the conductive wire comprises a first portion 102U and a second portion 102L, a second terminal part of the conductive wire comprises a first portion 103U and a second portion 103L.

Figure 3E:
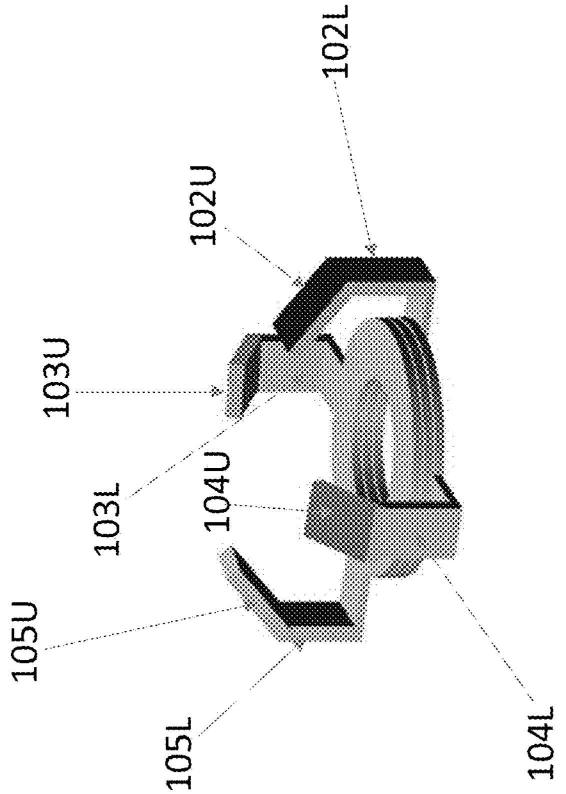
FIG. 3D-3E each illustrates a type of two coils for forming the magnetic device according to one embodiment of the present invention.
Figure 3D:
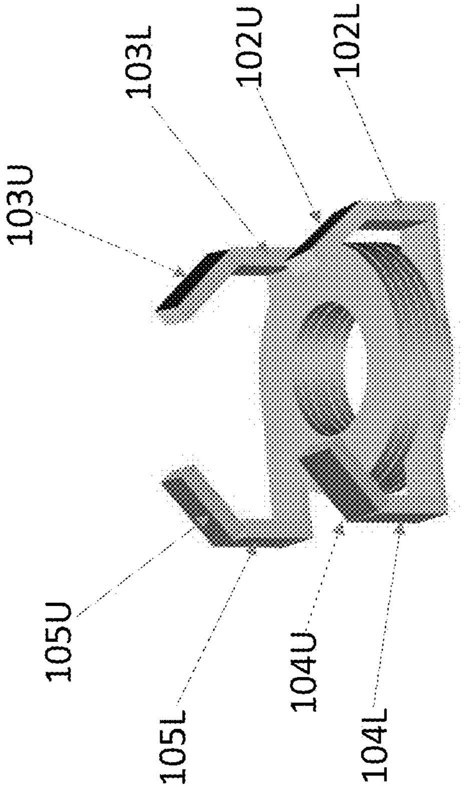

In one embodiment, as shown in FIG. 3D-3E, wherein each illustrates a type of two coils for forming the magnetic device according to one embodiment of the present invention, wherein a first terminal part of the first conductive wire comprises a first portion 102U and a second portion 102L, a second terminal part of the first conductive wire comprises a first portion 103U and a second portion 103L, a third terminal part of a second conductive wire comprises a first portion 104U and a second portion 104L, and a fourth terminal part of the second conductive wire comprises a first portion 105U and a second portion 105L.

Figure 4A:
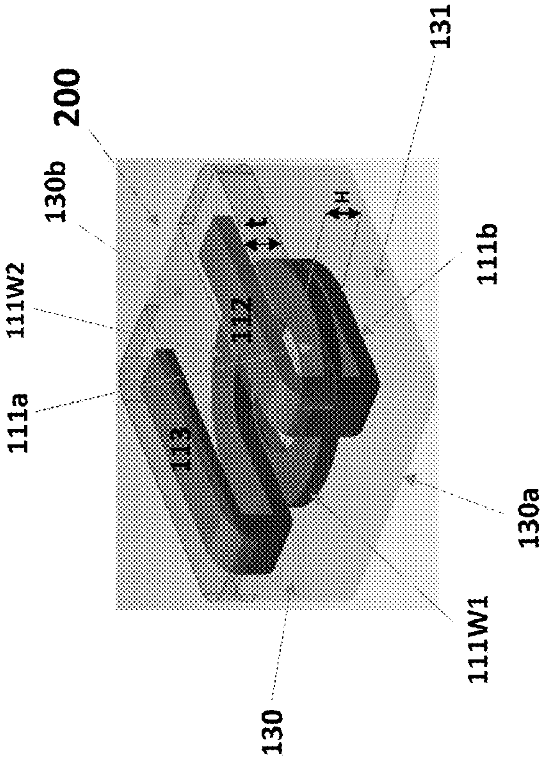
FIG. 4A depicts a top view of a magnetic device according to one embodiment of the present invention.
Figure 4B:
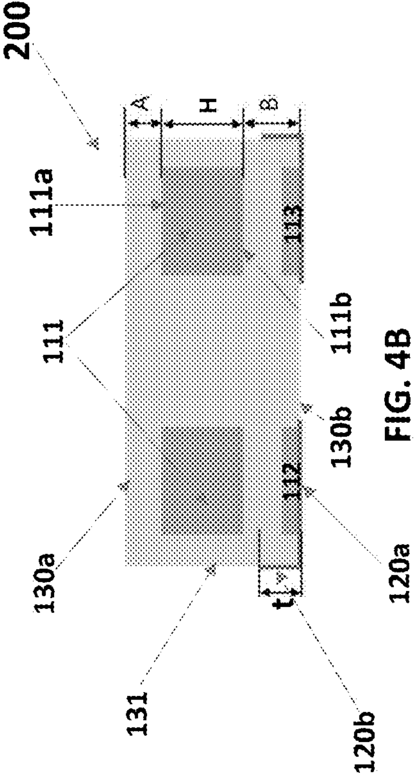
FIG. 4B depicts an enlarged cross-sectional view of a magnetic device according to one embodiment of the present invention.

FIG. 4A depicts atop view of a magnetic device and FIG. 4B depicts an enlarged cross-sectional view of a magnetic device, according to one embodiment of the present invention.

Please refer to FIG. 4A and FIG. 4B, wherein the magnetic device 200 comprises a body 130 having a top surface 130*a* and a bottom surface 130*b*; and a coil 111 that is formed by a conductive wire and has a plurality of winding turns 111W1, 111W2 wherein the plurality of winding turns 111W1, 111W are disposed in the body 130 and has a top surface 111*a* and a bottom surface 111*b*, wherein at least one portion of a first terminal part 112 of the conductive wire is exposed from the body 130, wherein a first electrode of the magnetic device 200 comprises at least one first metal layer 120*a* that is disposed on the bottom surface 130*b* of the body 130 and electrically connected to the first terminal part 112 of the conductive wire and at least one second metal layer 120*b* that is disposed on a lateral surface 131 of the body 130 and electrically connected to the at least one first metal layer 120*a*, wherein a first height t of the first electrode disposed on the lateral surface 131 of the body 130 is greater than zero and not greater than a second height H from the top surface 111*a* to the bottom surface 111*b* of the plurality of winding turns 111W1, 111W2 of the coil 111.

In one embodiment, the conductive wire forming the plurality of winding turns is an insulated conductive wire.

In one embodiment, the conductive wire forming the plurality of winding turns is an enameled conductive wire.

In one embodiment, the conductive wire forming the plurality of winding turns is an enameled copper wire.

In one embodiment, the conductive wire is a flat wire.

In one embodiment, the conductive wire is a round wire.

In one embodiment, wherein a second electrode of the magnetic device 200 comprises at least one third metal layer that is disposed on a bottom surface 130*b* of the body 130 and electrically connected to the second terminal part 113 of the conductive wire and at least one fourth metal layer that is disposed on a lateral surface of the body 130 and electrically connected to the at least one third metal layer, wherein a third height of the second electrode disposed on the lateral surface of the body 130 is greater than zero and not greater than the second height H from the top surface 111*a* to the bottom surface 111*b* of the plurality of winding turns of the coil 111.

In one embodiment, the present invention can increase the SMD (Surface-mounted Device) soldering strength of the electrode of the magnetic device.

Figure 4C:
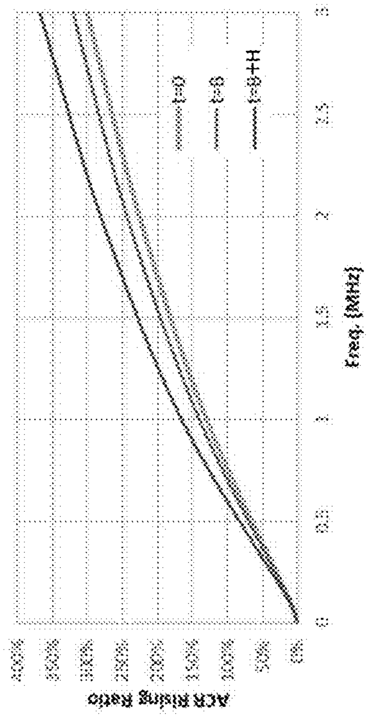
FIG. 4C compares the performance of ACR rising ratio at different frequencies based a height of the electrode disposed on the lateral surface of the body.

FIG. 4C compares the performance of ACR rising ratio at different frequencies based on the first height t of the electrode disposed on the lateral surface 131 of the body 130, wherein the ACR rising ratio is increasing when the first height t is increasing. As shown in FIG. 4C, the ACR rising ratio is low when the first height t is zero, and the ACR rising ratio is high when the first height t is equal to B plus the second height H between the top surface 111*a* and the bottom surface 111*b* of the plurality of winding turns 111W1, 111W2 of the coil 111, wherein B represents the vertical distance between the electrode on the lateral surface 131 of the body 130 and the bottom surface 111*b* of the plurality of winding turns 111W1, 111W2 of the coil 111.

The first height t of the electrode disposed on the lateral surface 131 of the body 130 is greater than zero and not greater than a second height H from the top surface 111*a* to the bottom surface 111*b* of the plurality of winding turns 111W1, 111W2 of the coil 111, which can maintain a good range of the ACR rising ratio of the magnetic device while increasing the SMD (Surface-mounted Device) soldering strength of the electrode of the magnetic device.

In one embodiment, as shown in FIG. 4B, the electrode disposed on the lateral surface 131 of the body 130 does not extend across the bottom surface 111*b* of the plurality of winding turns of the coil.

Although the present invention has been described with reference to the above embodiments, it will be apparent to one of ordinary skill in the art that modifications to the described embodiment may be made without departing from the spirit of the invention. Accordingly, the scope of the invention will be defined by the attached claims, not by the above-detailed descriptions.

What is claimed is:

1. A magnetic device, comprising:

a body; and a coil, formed by a flat wire and disposed in the body, wherein the coil comprises a plurality of winding turns that are stacked in a vertical direction, wherein a first terminal part of the flat wire comprises a first portion and a second portion, wherein the first portion of the first terminal part is exposed from the body for forming a first electrode of the magnetic device, and the second portion extends from a top portion of the coil to an endpoint of the first portion of the first terminal part, wherein the second portion of the first terminal part comprises an outer surface, wherein a vertical line passing through the endpoint passes through the second portion of the first terminal part and intersects the outer surface at a first intersection point, wherein the outer surface has a convex curve relative to the vertical line passing through the endpoint of the first portion of the first terminal part, and the convex curve is a smooth curve extending from the endpoint to the first intersection point, wherein a line segment of the vertical line extending from the endpoint to the first intersection point does not have any part that is located outside the boundary of the first terminal part of the flat wire.

2. The magnetic device according to claim 1, wherein a maximum horizontal distance between said convex curve and the vertical line is less than a thickness of the flat wire.

3. The magnetic device according to claim 1, wherein the magnetic device is an inductor, wherein the body comprises a magnetic body, wherein the coil is disposed in the magnetic body.

4. The magnetic device according to claim 1, wherein a second terminal part of the conductive wire comprises a first portion and a second portion, wherein the first portion of the second terminal part is exposed from the body for forming a second electrode of the magnetic device, and the second portion of the second terminal part extends from a bottom portion of the coil to an endpoint of the first portion of the second terminal part, wherein the second portion of the second terminal part comprises an outer surface that has a convex curve relative to a vertical line passing through the endpoint of the first portion of the second terminal part.

* * * * *